United States Patent [19]

Hwang et al.

[11] Patent Number: 4,522,894
[45] Date of Patent: Jun. 11, 1985

[54] FUEL CELL ELECTRIC POWER PRODUCTION

[75] Inventors: Herng-Shinn Hwang, Livingston; Ronald M. Heck, Frenchtown; Robert M. Yarrington, Westfield, all of N.J.

[73] Assignee: Engelhard Corporation, Iselin, N.J.

[21] Appl. No.: 599,865

[22] Filed: Apr. 13, 1984

Related U.S. Application Data

[63] Continuation of Ser. No. 430,455, Sep. 30, 1982, abandoned.

[51] Int. Cl.$^3$ .............................................. H01M 8/04
[52] U.S. Cl. ...................................... 429/17; 429/19; 429/20
[58] Field of Search ................. 429/17, 19, 20, 12, 429/13; 423/648 R; 252/373; 518/703

[56] References Cited

U.S. PATENT DOCUMENTS

| | | | |
|---|---|---|---|
| 3,388,074 | 6/1968 | Reitmeier et al. | 252/376 |
| 3,446,594 | 5/1969 | Buswell et al. | 423/648 R |
| 3,655,448 | 4/1972 | Setzer | 429/20 |
| 3,976,507 | 8/1976 | Bloomfield | 429/17 |
| 4,120,787 | 10/1978 | Yargeau | 429/17 X |
| 4,128,700 | 12/1978 | Sederquist | 429/17 |
| 4,200,682 | 4/1980 | Sederquist | 429/17 |
| 4,203,963 | 5/1980 | Scheffler et al. | 429/20 X |

Primary Examiner—Anthony Skapars

[57] ABSTRACT

A process for generating electricity from a fuel cell includes generating a hydrogen-rich gas as the fuel for the fuel cell by treating a hydrocarbon feed, which may be a normally liquid feed, in an autothermal reformer utilizing a first monolithic catalyst zone having palladium and platinum catalytic components therein and a second, platinum group metal steam reforming catalyst. Air is used as the oxidant in the hydrocarbon reforming zone and a low oxygen to carbon ratio is maintained to control the amount of dilution of the hydrogen-rich gas with nitrogen of the air without sustaining an insupportable amount of carbon deposition on the catalyst. Anode vent gas may be utilized as the fuel to preheat the inlet stream to the reformer. The fuel cell and the reformer are preferably operated at elevated pressures, up to about a pressure of 150 psia for the fuel cell.

23 Claims, 2 Drawing Figures

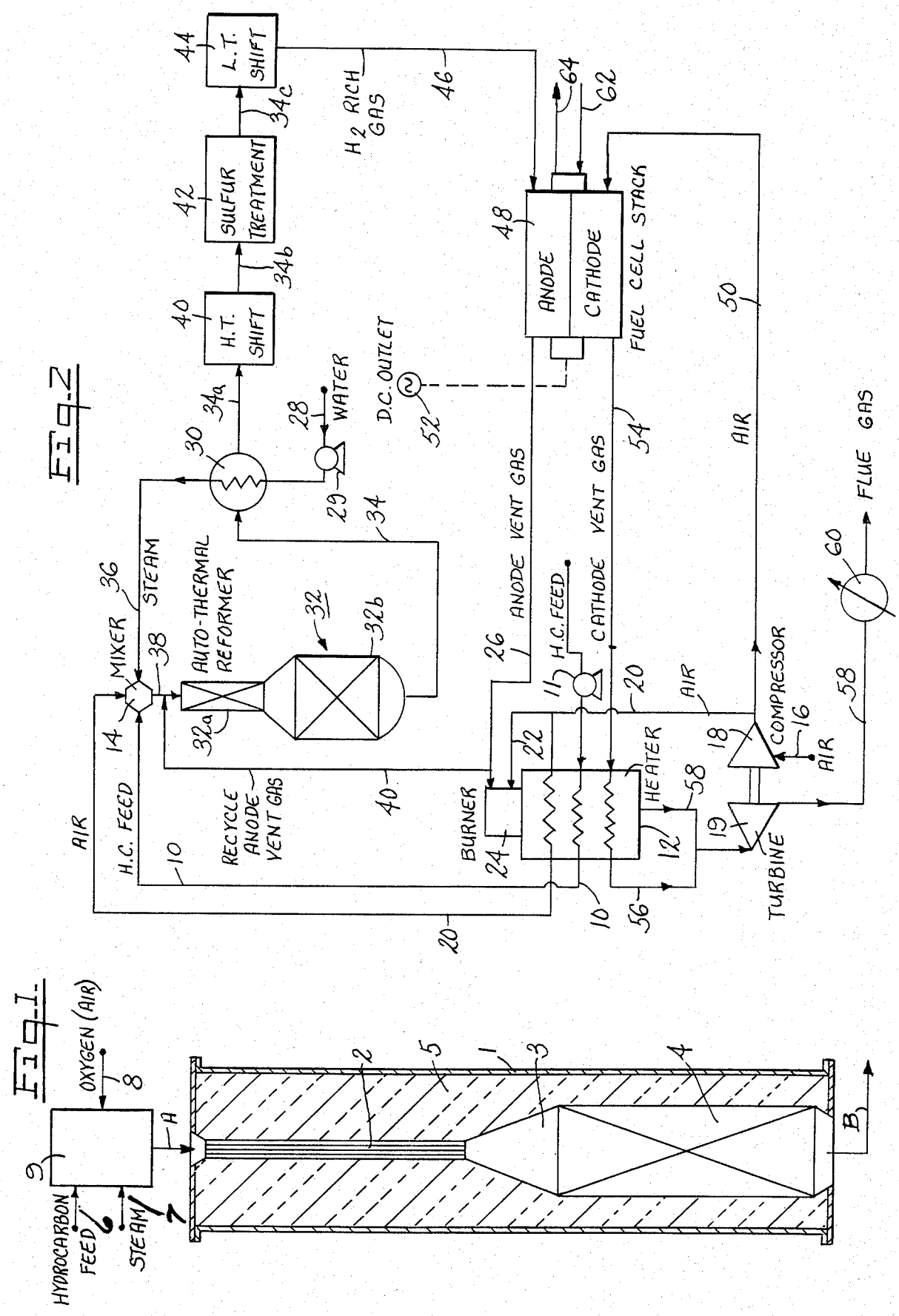

FUEL CELL ELECTRIC POWER PRODUCTION

This is a continuation of application Ser. No. 430,455 filed Sept. 30, 1982, now abandoned.

BACKGROUND OF THE INVENTION

The present invention is concerned with production of electric power from a hydrogen fueled fuel cell supplied with hydrogen by an autothermal reforming process.

As is well known in the art, fuel cells generate electric current by the reaction of a fuel and oxidant brought into contact with a suitable electrolyte. Current is generated by a catalyzed chemical reaction on electrode surfaces which are maintained in contact with the electrolyte. Known types of fuel cells include a bipolar, phosphoric acid electrolyte cell which utilizes hydrogen as the fuel and the oxygen in air as the oxidant. One such phosphoric acid electrolyte cell available from Engelhard Corporation, the assignee of this application, utilizes a matrix type construction with bipolar stacking of hydrophobic electrodes, a concentrated phosphoric acid electrolyte and one or more platinum group metals as the electrode catalyst. Air or air with a circulating coolant may be used for heat and water removal from the cell, which is capable of utilizing impure hydrogen as the fuel. Other types of fuel cells which use hydrogen as the fuel are of course known, utilizing various cell constructions and various electrolytes such as aqueous potassium hydroxide, fused alkali carbonate, solid polymer electrolytes, etc. Various electrode catalysts, such as nickel, silver, base metal oxides and tungsten carbide are known as electrode catalysts. Although other fuels such hydrazine are known, hydrogen is the most commonly utilized fuel for fuel cells and reacts therein with oxygen introduced to the cell to yield water as a reaction by-product.

Fuel cells offer the possibility of significant advantages over other electrical power sources including low operating costs, modular construction which enables "tailor-made" sizing and siting of the units, and protection of the environment in view of the lack of significant noxious exhaust. A significant factor is the availability of a reliable and suitable source of hydrogen fuel. Hydrogen may be prepared from hydrocarbons by the partial oxidation of heavier hydrocarbons, such as fuel oil and coal, and by steam reforming of lighter hydrocarbons such as natural gas and naphthas. Processes to derive hydrogen from methanol or coal-derived hydrocarbons are also known. Generally, difficulties associated with the preparation of hydrogen from heavier feedstocks favor the use of light naphthas or natural gas as the hydrocarbon source. However, shortages of such feeds indicate the need for an economical method of generating a hydrogen-rich gas suitable for use as a fuel cell fuel from heavier feedstocks, such as normally liquid hydrocarbons. Further, most fuel cells are sensitive to hydrocarbons in the hydrogen fuel, so that it is necessary to eliminate or reduce to very low levels any residual hydrocarbons in the hydrogen fuel.

Steam reforming is a well known method for generating hydrogen from light hydrocarbon feeds and is carried out by supplying heat to a mixture of steam and a hydrocarbon feed while contacting the mixture with a suitable catalyst, usually nickel. However, steam reforming is generally limited to paraffinic naptha and lighter feeds which have been de-sulfurized and treated to remove nitrogen compounds, because of difficulties in attempting to steam reform heavier hydrocarbons and the poisoning of steam reforming catalysts by sulfur and nitrogen compounds.

Another known method of obtaining hydrogen from a hydrocarbon feed is the partial oxidation process in which the feed is introduced into an oxidation zone maintained in a fuel rich mode so that only a portion of the feed is oxidized. Steam may be injected into the partial oxidation reactor vessel to react with the feed and with products of the partial oxidation reaction. The process is not catalytic and requires high temperatures to carry the reactions to completion, resulting in a relatively high oxygen consumption. On the other hand, the partial oxidation process has the advantage that it is able to readily handle hydrocarbon liquids heavier than paraffinic naphthas and can even utilize coal as the source of the hydrocarbon feed.

Catalytic autothermal reforming of hydrocarbon liquids is also known in the art, as evidenced by a paper *Catalytic Autothermal Reforming of Hydrocarbon Liquids* by Maria Flytzani-Stephanopoulos and Gerald E. Voecks, presented at the American Institute of Chemical Engineers' 90th National Meeting, Houston, Texas, Apr. 5–9, 1981. Autothermal reforming is defined therein as the utilization of catalytic partial oxidation in the presence of added steam, which is said to increase the hydrogen yield because of simultaneous (with the catalytic partial oxidation) steam reforming being attained. Steam, air and a No. 2 fuel oil are injected through three different nickel particulate catalysts. The resulting product gases contained hydrogen and carbon oxides.

In *Brennstoff-Chemie* 46, No. 4, p. 23 (1965), a German publication, Von P. Schmulder describes a Badische Anilin and Soda Fabrik (BASF) process for autothermal reforming of gasoline utilizing a first, pelletized, platinum catalyst zone followed by a second, pelletized nickel catalyst zone. A portion of the product gas is recycled to the process.

Disclosure of the utilization of a noble metal catalyzed monolith to carry out a catalytic partial oxidation to convert more than half of the hydrocarbon feedstock upstream of a stream reforming zone is disclosed in an abstract entitled "Evaluation of Steam Reforming Catalyst for use in the Auto-Thermal Reforming of Hydrocarbon Feed Stocks" by R. M. Yarrington, I. R. Feins, and H. S. Hwang (National Fuel Cell Seminar, July 14–16, 1980, San Diego). The abstract noted the unique ability of rhodium to steam reform light olefins with little coke formation and noted that results were obtained for a series of platinum-rhodium catalysts with various ratios of platinum to total metal in which the total metal content was held constant.

U.S. Pat. No. 4,054,407, assigned to the assignee of this application, discloses two-stage catalytic oxidation using platinum group metal catalytic components dispersed on a monolithic body. At least the stoichiometric amount of air is supplied over the two stages and steam is not employed.

U.S. Pat. No. 3,481,722, assigned to the assignee of this application, discloses a two-stage process for steam reforming normally liquid hydrocarbons using a platinum group metal catalyst in the first stage. Steam and hydrogen, the latter of which may be obtained by partially cracking the hydrocarbon feed, are combined with the feed to the process.

The use of autothermal reforming as part of an integral fuel cell power plant to generate a hydrogen fuel from a hydrocarbon feed in order to supply a fuel cell, is shown in U.S. Pat. No. 3,976,507, issued Aug. 24, 1976 to D. P. Bloomfield. An autothermal reactor converts a hydrocarbon feed to supply a hydrogen-rich fuel to the anode gas space. The plant includes a compressor driven by exhaust gases from a catalytic burner to compress air supplied to the cathode gas space of a fuel cell stack. The cathode vent gas from the fuel cell is fed to the autothermal reactor and the anode vent gas is fed to the catalytic burner.

The present invention provides a highly efficient method for producing hydrogen-rich feeds for fuel cells from hydrocarbons which attains excellent yields in a relatively compact and simple apparatus.

SUMMARY OF THE INVENTION

In accordance with the present invention there is provided a process for generating electricity from a fuel cell means, the fuel cell means comprising a stack of anodes and cathodes and having an anode side and a cathode side, each side dimensioned and configured for the passage of respective gas streams therethrough, the fuel cell means being fueled by a hydrogen-rich gas derived by treating a hydrocarbon feed in a reformer having first and second catalyst zones as defined below. The process comprises the following steps. Preheating an inlet stream comprising a hydrocarbon feed, $H_2O$ and air to a preheat temperature sufficiently high to initiate catalytic oxidation of the hydrocarbon feed as defined below. Introducing the preheated inlet stream into the first catalyst zone, which comprises a monolithic body having a plurality of gas flow passages extending therethrough and containing a catalytically effective amount of palladium and platinum catalytic components dispersed therein, the amounts of hydrocarbon feed, $H_2O$ and air introduced into the first catalyst zone being controlled to maintain an $H_2O$ to C ratio of at least about 0.5 and an $O_2$ to C ratio of from about 0.3 to 0.4 in the inlet stream. Contacting the preheated inlet stream within said first catalyst zone with the platinum group metal catalyst to initiate and sustain therein catalytic oxidation of the hydrocarbon feed to produce hydrogen and carbon oxides therefrom. The temperatures of at least a portion of the monolithic body being at least about 250° F. (139° C.) greater than the ignition temperature of inlet stream. Oxidizing in the first catalyst zone a quantity, less than all, of the hydrocarbon feed, which quantity is sufficient (i) to attain a temperature within the first catalyst zone which is sufficiently high to crack substantially all unoxidized $C_5$ or heavier hydrocarbons, if any, therein to $C_1$ to $C_4$ hydrocarbons, and (ii) to heat such first zone effluent to an elevated temperature high enough to catalytically steam reform, within a second catalyst zone defined below, hydrocarbon remaining in such first zone effluent without supplying external heat thereto. Passing the first zone effluent, while still at an elevated temperature, from the first catalyst zone to the second catalyst zone which contains a platinum group metal steam reforming catalyst therein, and contacting the first zone effluent in the second catalyst zone with the steam reforming catalyst to react hydrocarbons therein with $H_2O$ to produce hydrogen and carbon oxides therefrom. Withdrawing the effluent of the second catalyst zone as a hydrogen-rich gas and passing the reformer product gas to the anode side of said fuel cell means. Introducing an air stream to the cathode side of the fuel cell means, and operating the fuel cell means to generate therefrom output electricity, a hydrogen-containing anode vent gas, and a cathode vent gas.

In preferred aspects of the invention, the inlet stream is introduced into the reformer at a reformer elevated pressure, at which pressure the reformer is operated, and the fuel cell means is operated at a fuel cell elevated pressure. The reformer elevated pressure is at least as high as the fuel cell elevated pressure which, preferably, is from above atmospheric to about 150 psia (pounds per square inch absolute).

In other aspects of the invention, a portion at least of the anode vent gas is combusted to supply heat for the preheating of the inlet stream. The preheating may be to a temperature of about 1200° F. to 1400° F. (649° C. to 760° C.) and the first catalyst zone may be maintained at a temperature of from about 1600° F. to 2,400° F. (871° C. to 1,316° C.), with the first catalyst zone effluent introduced into the second catalyst zone at substantially the same temperature.

Generally, the preheating temperature is adjusted in relation to the $O_2$ to C ratio to obtain a desired temperature in the first catalyst zone. The temperature of the first zone effluent will be influenced by the extent of the cracking and the amount of steam reforming occurring in the first catalyst zone.

In certain aspects of the invention, the catalytic components of the first catalyst zone comprise, on an elemental metal basis, about 10 to 90% by weight palladium (preferably 25 to 75%, more preferably 60-40% weight palladium) and about 90 to 10% by weight platinum (preferably 75 to 25%, more preferably 40-60% by weight platinum). The catalytic components of the second catalyst zone comprise about 10 to 90% by weight rhodium (preferably about 20 to 40% by weight) and about 90 to 10% by weight platinum (preferably 80 to 60% by weight.)

In certain preferred aspects of the invention, a volumetric hourly rate of at least 100,000 volumes of throughput per volume of catalyst is maintained in the first catalyst zone and from 2,000 to 20,000 (same units) in the second catalyst zone. All references herein and in the claims to volumetric hourly rates are at standard temperature and pressure.

In accordance with a preferred aspect of the invention, the platinum group metal catalytic component of the first catalyst zone comprises platinum, palladium and rhodium, preferably platinum and paladium, distended upon a refractory metal oxide support layer (preferably a stabilized alumina) carried on the monolithic body, and the steam reforming catalyst may comprise a platinum group metal, preferably platinum and palladium, similarly distended upon a refractory metal oxide support, preferably stabilized alumina. The steam reforming catalyst may be either a monolithic body or a particulate catalyst.

In other aspects of the invention, the hydrocarbon feed is a normally liquid hydrocarbon, the $H_2O$ to C ratio is from about 0.5 to 5, the $O_2$ to C ratio is preferably from about 0.3 to 0.35, and the first air stream (part of the inlet stream) and the second air stream (fed to the cathode side of the fuel cell) are compressed in a turbine driven compressor, the turbine of which is driven at least in part by the combustion products of the discharged anode gas.

BRIEF DESCRIPTION OF THE DRAWINGS

FIG. 1 is a schematic elevation view in cross section of a laboratory or pilot plant size embodiment of an autothermal reformer apparatus utilizable in accordance with the present invention; and FIG. 2 is a flow sheet diagram of a fuel cell power plant in accordance with one embodiment of the invention, including an autothermal reformer for production of a hydrogen-rich gas.

DESCRIPTION OF THE PREFERRED EMBODIMENTS

In a preferred embodiment of the present invention, a fuel cell power plant includes an autothermal reformer for on-site generation of the hydrogen-rich fuel supplied to the fuel cell stack. The autothermal reformer includes a first catalyst zone for carrying out catalytic partial oxidation, an exothermic reaction, and a second catalytic zone for carrying out steam reforming, an endothermic reaction. Some steam reforming also appears to take place in the first catalyst zone and thereby moderates somewhat the temperatures attained in the first catalyst zone inasmuch as the endothermic steam reforming absorbs some of the heat generated by the partial oxidation step. The net reaction in the first catalyst zone is however exothermic and the zone is therefore referred to as an exothermic catalyst zone. The exothermic, first catalyst zone comprises a monolithic catalyst carrier on which a platinum group metal catalyst is dispersed. Such catalyst can effectively catalyze the partial oxidation of not only gaseous and light hydrocarbon liquids such as natural gas or paraffinic naphtha, but of heavier hydrocarbons such as diesel oil, number 2 fuel oil, and coal derived liquids. As compared to a non-catalytic combustion process such as conventional, non-catalytic partial oxidation, catalytic partial oxidation enables the utilization of lesser amounts of oxygen and lower temperature levels to both oxidize a portion of the feed and crack heavier feed stocks to lighter hydrocarbon fractions, while raising the temperature of the reactant mass for subsequent treatment. The ability to utilize less oxygen is important in the preparation of a hydrogen-containing gas for fuel cell use when air is employed as the oxygen source for the reforming process. By utilizing less air the proportion of nitrogen in the product hydrogen-rich gas is reduced, thereby increasing the partial pressure of hydrogen in the product gas. In this regard, a significant advantage of the present invention is the ability to operate the autothermal reforming at quite low $O_2$ to C ratios without carbon depositing on the catalysts. Sufficient oxygen must be provided to preclude accumulation of such carbon deposits to a degree sufficient to impede operation of the catalyst. Of course, there must also be sufficient oxygen to provide enough oxidation in the first zone to heat the reactants sufficiently to sustain the catalytic oxidation reaction and provide sufficient heat for the following steam reforming step, in addition to converting a sufficient proportion of the hydrocarbon feed to hydrogen. Generally, a theoretical $O_2$ to C ratio of at least 0.28 is required for this purpose, and as a practical matter a minimum ratio of 0.3 is employed. On the other hand, to avoid the expense of having to provide pure oxygen or an oxygen-enriched gas, air is used in the process so that nitrogen is necessarily introduced into the stream. Accordingly, a maximum ratio of $O_2$ to C of about 0.4, preferably about 0.35, is used to control the amount of nitrogen dilution of the product hydrogen fuel.

Generally, at least about half the hydrocarbon feed stock is partially oxidized in the catalytic partial oxidation zone to produce primarily carbon monoxide and hydrogen and the heat required for the endothermic steam reforming reaction, which takes place in the second catalyst zone. Substantially all of the limited amount of oxygen introduced into the first catalyst zone is consumed in the catalytic partial oxidation step. At the temperatures maintained in the catalytic oxidation zone, and in the presence of the product hydrogen and catalyst utilized in the first zone, a degree of hydrocracking of unoxidized $C_5$ and heavier hydrocarbon feed takes place to form $C_4$ and lighter compounds. The effluent gas from the first catalyst zone thus contains primarily CO, $CO_2$, $H_2$, $H_2O$, $N_2$, $C_2$ to $C_4$ and other lighter hydrocarbons, including olefins, and, depending upon the sulfur content of the feed stock, $H_2S$ and COS.

In preparing a hydrogen-rich feed for a fuel cell, the first, or catalytic partial oxidation zone of the autothermal reformer is operated at relatively high temperatures, say 1600° F. to 2400° F. (871° C. to 1316° C.) to convert a substantial portion of the hydrocarbon feedstock to CO, $CO_2$, $H_2$ and light hydrocarbons.

The endothermic, second catalyst zone may contain any suitable platinum group metal steam reforming catalyst appropriate to the hydrocarbon feed and operating conditions. Usually, the steam reforming catalyst will be utilized in the form of a particulate bed comprised of spheres, extrudates, granules, configured packing material, e.g., rings, saddles or the like, or any suitable shape. Obviously, a combination of different types of particulate materials may be utilized as the steam reforming catalyst. Further, a monolithic catalyst carrier may also be used in the second catalyst zone, as is used in the first catalyst zone.

The combination of features provided by the process of the present invention provides a highly efficient method of operating a fuel cell power plant by converting various types of normally liquid hydrocarbon feeds to a hydrogen-rich fuel gas for the fuel cell. The combination of the monolithic platinum group metal partial oxidation catalyst with a platinum group metal steam reforming catalyst provides a great flexiblity in handling diverse feed stocks, includng heavy feedstocks not normally suited for generating a fuel cell feed, and in producing a hydrogen-rich gas having characteristics designed for a specific purpose. Utilization of platinum group metal catalysts enables operations at relatively very low $O_2$ to C ratios thereby reducing nitrogen dilution of the feed, without carbon deposition fouling the catalysts.

The Monolithic Partial Oxidation Catalyst

The partial oxidation catalyst is provided on a monolithic carrier, that is, a carrier of the type comprising one or more monolithic bodies having a plurality of finely divided gas flow passages extending therethrough. Such monolithic carrier members are often referred to as "honeycomb" type carriers and are well known in the art. A preferred form of such carrier is made of a refractory, substantially inert rigid material which is capable of maintaining its shape and a sufficient degree of mechanical strength at high temperatures, for example, up to about 3,272° F. (1,800° C.). Typically, a material is selected for the support which exhibits a low thermal coefficient of expansion, good thermal shock resistance and, though not always, low thermal conductivity. Two general type of material of construction for such carriers are known. One is a ceramic-like porous material comprised of one or more metal oxides, for example; alumina, alumina-silica, alumina-silica-titania, mullite, cordierite, zirconia, zirconia-spinel, zirconia-mullite, silicon carbide, etc. A particularly preferred and commercially available material of construction for operations below about 2,000° F. (1,093° C.) is cordierite, which is an alumina-magnesia-silica material. For applications involving operations above about 2,000° F. (1,093° C.), an alumina-silica-titania material is preferred. Honeycomb monolithic supports are commercially available in various sizes and configurations. Typically, the monolithic carrier would comprise, e.g., a cordierite member of generally cylindrical configuration (either round or oval in cross section) and having a plurality of parallel gas flow passages of regular polygonal cross sectional extending therethrough. The gas flow passages are typically sized to provide from about 50 to 1,200, e.g., 200–600 gas flow channels per square inch of face area.

The second major type of preferred material of construction for the carrier is a heat- and oxidation-resistant metal, such as stainless steel or the like. Monolithic supports are typically made from such materials by placing a flat and a corrugated metal sheet one over the other and rolling the stacked sheets into a tubular configuration about an axis parallel to the corrugations, to provide a cylindrical-shaped body having a plurality of fine, parallel gas flow passages extending therethrough. The sheets and corrugations are sized to provide the desired number of gas flow passages, which may range, typically, from about 200 to 1,200 per square inch of end face area of the tubular roll.

Although the ceramic-like metal oxide materials such as cordierite or alumina-silica-titania are somewhat porous and rough-textured, they nonetheless have a relatively low surface area with respect to catalyst support requirements and, of course, a stainless steel or other metal support is essentially smooth. Accordingly, a suitable high surface area refractory metal oxide support layer is deposited on the carrier to serve as a support upon which finely dispersed catalytic metal may be distended. As is known in the art, generally, oxides of one or more of the metals of Groups II, III, and IV of the Periodic Table of Elements having atomic numbers not greater than 40 are satisfactory as the support layer. Preferred high surface area support coatings are alumina, beryllia, zirconia, baria-alumina, magnesia, silica, and combinations of two or more of the foregoing.

The most preferred support coating is alumina, most preferably a stabilized, high-surface area transition alumina. As used herein and in the claims, "transition alumina" includes gamma, chi, eta, kappa, theta and delta forms and mixtures thereof. An alumina comprising or predominating in gamma alumina is the most preferred support layer. It is known that certain additives such as, e.g., one or more rare earth metal oxides and/or alkaline earth metal oxides may be included in the transition alumina (usually in amounts comprising from 2 to 10 weight percent of the stabilized coating) to stabilize it against the generally undesirable high temperature phase transition to alpha alumina, which is a relatively low surface area. For example, oxides of one or more of lanthanum, cerium, praseodymium, calcium, barium, strontium and magnesium may be used as a stabilizer. The specific combination of oxides of lanthanum and barium is a preferred stabilizer for transition alumina.

The platinum group metal catalytic component of the catalytic partial oxidation catalyst comprises palladium and platinum and, optionally, one or more other platinum group metals. As used herein and in the claims, "platinum group metals" means platinum, palladium, rhodium, iridium, osmium and ruthenium. Preferred platinum group metal components are palladium and platinum and, optionally, rhodium. The platinum group metal may optionally be supplemented with one or more base metals, particularly base metals of Group VII and metals of Groups VB, VIB and VIB of the Periodic Table of Elements. Preferably, one or more of chromium, copper, vanadium, cobalt, nickel and iron may be employed.

Desirable catalysts for partial oxidation should have the following properties: They should be able to operate effectively under conditions varying from oxidizing at the inlet to reducing at the exit; they should operate effectively and without significant temperature degradation over a temperature range of about 800° F. to about 2,400° F. (427° C. to 1315° C.); they should operate effectively in the presence of carbon monoxide, olefins and sulfur compounds; they should provide for low levels of coking such as by preferentially catalyzing the reaction of carbon with $H_2O$ to form carbon monoxide and hydrogen thereby permitting only a low level of carbon on the catalyst surface; they must be able to resist poisoning from such common poisons as sulfur and halogen compounds; further, all of these requirements must be satisfied simultaneously. For example, in some otherwise suitable catalysts, carbon monoxide may be retained by the catalyst metal at low temperatures thereby decreasing or modifying its activity. The combination of platinum and palladium is a highly efficient oxidation catalyst for the purposes of the present invention. Generally, the catalytic activity of platinum-palladium combination catalysts is not simply an arithmetic combination of their respective catalytic activities; the disclosed range of proportions of platinum and palladium have been found to provide efficient and effective catalytic activity in treating a rather wide range of hydrocarbon feeds with good resistance to high temperature operation and catalyst poisons.

The following data compares the effectiveness of palladium, rhodium and platinum, respectively, for the oxidation of methane and further compares the efficacy of, respectively, palladium-platinum, palladium-rhodium and platinum-rhodium combined catalyst for oxidation of methane.

The catalyst of Table I-A comprise a lanthia-chromia-alumina frit impregnated with the platinum group metals by techniques as described above. The frit has the following composition:

| Component | Weight Percent |
| --- | --- |
| $La_2O_3$ | 3.8 |
| $Cr_2O_3$ | 1.8 |
| $Al_2O_3$ | 94.4 |

The lanthia-chromia stabilized alumina is then impregnated with the platinum group metal and calcined in air for four hours at 230° F. and for an additional four hours at 1600° F. Three catalysts of different platinum metal loadings were prepared as follows:

| Sample No. | Weight Percent | | | |
|---|---|---|---|---|
| | Pd | Pt | Rh | Total PGM |
| 4063U-1 | 3.42 | 5.95 | — | 9.37 |
| 4063R-1 | 4.58 | — | 4.52 | 9.10 |
| 4063V-1 | — | 5.62 | 3.14 | 8.76 |

The resultant platinum group metal (PGM)-impregnated alumina frit was deposited on alumina beads and the thus-coated beads were placed in a shallow bed and tested by passing a 1% (volume) methane, 99% (volume) air feed at about atmospheric pressure through the catalyst. An electric heater was used to cyclically heat the test gas stream fed to the catalyst, and conversion results at the indicated temperatures were obtained on both the heating and cooling phases of each heat cycle.

The results are shown in the following Table I-A.

TABLE 1-A

| Sample No. | PGM (Mole Ratio) | Ignition Temp. °F. | Weight Percent of Original Methane Content Converted at Indicated Temperature (°F.) | | | | | |
|---|---|---|---|---|---|---|---|---|
| | | | 600° | 700° | 800° | 900° | 1000° | 1100° |
| 4063U-1 | Pd, Pt (1:1) | 610 | — | 3 | 10 | 26 | 60 | 80 |
| 4063R-1 | Pd, Rh (1:1) | 710 | — | — | 2 | 5 | 9 | 12 |
| 4063V-1 | Pt, Rh (1:1) | 730 | — | — | 1 | 1 | 3 | 5 |

These data demonstrate the ability of platinum-palladium catalyst to promote catalytic oxidation of methane over a wide range of temperature.

Rhodium may optionally be included with the platinum and palladium. Under certain conditions, rhodium is an effective oxidation as well as a steam reforming catalyst, particularly for light olefins. The combined platinum group metal catalysts of the invention also have a significant advantage in the ability to catalyze the autothermal reactions at quite low ratios of $H_2O$ to carbon (atoms of carbon in the feed) and oxygen to carbon, without significant carbon deposition on the catalyst. This important feature provides flexibility in selecting $H_2O$ to C and $O_2$ to C ratios in the inlet streams to be processed.

The platinum group metals employed in the catalysts of the present invention may be present in the catalyst composition in any suitable form, such as the elemental metals, as alloys or intermetallic compounds with the other platinum group metal or metals present, or as compounds such as an oxide of the platinum group metal. As used in the claims, the terms palladium, platinum and/or rhodium "catalytic component" or "catalytic components" is intended to embrace the specified platinum group metal or metals present in any suitable form. Generally, reference in the claims or herein to platinum group metal or metals catalytic component or components embraces one or more platinum group metals in any suitable catalytic form. Table I-A demonstrates that the palladium-rhodium and platinum-rhodium combinations are rather ineffective for methane oxidation. The effectivenss of rhodium as a methane oxidation catalyst is attenuated by the relatively high calcination temperature of 1600° F. At a lower calcination temperature used in preparation of the catalyst, say 1100° F., rhodium retains good methane oxidation characteristics. However, the catalytic partial oxidation catalyst of the present invention may operate at ranges well above 1100° F., which would probably also reduce the effectiveness of rhodium for methane oxidation.

The tests in which the results of Table I-B were developed used a bed of the platinum group metal-impregnated frit dispersed on alumina beads, rather than a monolithic body on which the frit is dispersed. The bed of frit-coated beads was of shallow depth to avoid excessive pressure drop. The geometric configuration of a 400 cell/in² monolithic body provides more geometric surface area exposed to the reactant gas than does a bed of coated beads. The catalytic partial oxidation reactions of this invention are extremely rapid at the temperatures involved. Therefore, the catalytic metals on the surface of the catalyst body are predominantly involved in the reactions. The results of the tests with coated beads are indicative of results with monolithic bodies, but lower catalytic metal loading can be used with the latter as compared to metal loadings on beads, to attain equivalent results.

Table I-B shows the results of testing a monolithic body-supported catalyst on which a ceria-stabilized alumina frit impregnated with the indicated platinum group metals was dispersed upon a monolithic support. The alumina frit comprised 5% by weight $CeO_2$, balance $Al_2O_3$, impregnated with one or two platinum group metals to provide the PGM loadings indicated in Table I-B. The catalyst was calcined in air at 500° C. for two hours and then was aged 24 hours at 1800° F. in air.

Two different test gases, A and B, having the following compositions were passed through the catalyst:

| COMPOSITION | PARTS PER MILLION (VOL) OR VOLUME PERCENT | |
|---|---|---|
| | A | B |
| $O_2$ | 3% | 3% |
| CO | 1% | 1% |
| $CO_2$ | 10% | 10% |
| $H_2O$ | 10% | 10% |
| NO | 500 ppm | 500 ppm |
| $C_2H_4$ | 300 ppm | — |
| $C_3H_8$ | — | 300 ppm |
| $N_2$ | balance | balance |

Table I-B indicates the temperature in degree centigrade necessary for conversion of 50% by weight of the original amount of the component present, indicated under the column heading $T_{50}$, and the temperature required for 75% by weight conversion, under the heading $T_{75}$. A lower temperature accordingly indicates a more active catalyst. The results obtained are as follows; the platinum group metal (PGM) loading on the monolithic support is shown as grams of platinum group metal per cubic inch of monolithic catalyst.

TABLE I-B

| Catalyst Sample No. | Weight Ratio Pt:Pd | PGM PGM Loading Pt/Pd (g/in³) | Total PGM Loading (g/in³) |
|---|---|---|---|
| 892-68-SSP | 100:0 | .051/— | .051 |
| 892-69-SSP | 82:18 | .044/.010 | .054 |
| 892-70-SSP | 58:42 | .027/.019 | .046 |
| 892-71-SSP | 25:75 | .011/.031 | .042 |
| 892-72-SSP | 0:100 | —/.039 | .039 |
| 892-76-SSP | 11:89 | .003/.025 | .028 |

TABLE I-B-continued

| | | Test Gas A | | | | Test Gas B | | | |
|---|---|---|---|---|---|---|---|---|---|
| P-PX | 100:0 | .035/— | | | | .035 | | | |
| P-PXIIB | 70:30 | .034/.044 | | | | .048 | | | |

| | | Test Gas A | | | | Test Gas B | | | |
|---|---|---|---|---|---|---|---|---|---|
| Component | | CO | | $C_2H_4$ | | CO | | $C_3H_8$ | |
| Percent Conversion | | $T_{50}$ | $T_{75}$ | $T_{50}$ | $T_{75}$ | $T_{50}$ | $T_{75}$ | $T_{50}$ | $T_{75}$ |
| PGM | Sample No. | °C. | | °C. | | °C. | | °C. | |
| (Pt) | 892-68-SSP | 325 | 335 | 325 | 335 | 265 | 275 | 470 | 565 |
| (Pd/Pt) | 892-69-SSP | 270 | 275 | 280 | 290 | 280 | 285 | 545 | 615 |
| (Pd/Pt) | 892-70-SSP | 235 | 250 | 260 | 305 | 260 | 265 | 495 | 640 |
| (Pd/Pt) | 892-71-SSP | 235 | 245 | 260 | 320 | 260 | 270 | 465 | 585 |
| (Pd) | 892-72 SSP | 230 | 235 | 245 | 270 | 245 | 255 | 440 | 510 |
| (Pd/Pt) | 892-76-SSP | 270 | 275 | 275 | 315 | 245 | 255 | 430 | 555 |
| (Pt) | P-PX | 345 | 355 | 350 | 365 | 320 | 330 | 495 | 550 |
| (Pd/Pt) | P-PXIIB | 255 | 265 | 265 | 290 | 245 | 250 | 485 | 585 |

The data of Table I-B demonstrates the lower temperatures at which a palladium containing catalyst will attain, respectively, 50% and 75% conversion of carbon monoxide, ethylene and propane as compared to a platinum only catalyst. As mentioned above, the presence of platinum in addition to palladium provides effective catalyzation of other species as well as providing enhanced poison resistance.

An examplary mode of preparation of partial oxidation catalyst compositions utilizable in accordance with the present invention is set forth in the following Example 1.

EXAMPLE 1

(a) To 229 g of 2.5 wt % lanthia, 2.5 wt % baria, 95 wt % $Al_2O_3$ powder (a predominantly gamma alumina which has been stabilized by incorporation of lanthia and baria therein) is added a solution containing 21 g Pt as $H_2Pt(OH)_6$ solubilized in monoethanolamine so as to give total volume of 229 ml. After mixing for 5 minutes, 25 ml of glacial acetic acid is added and the material is mixed an additional 5 minutes before being dried and then calcined for one and one-half hours at 350° C. in air to form a free flowing powder.

(b) Similarly, to 229 g of 2.5 wt % lanthia, 2.5 wt % baria—95 wt % $Al_2O_3$ powder there is added 21 g Pd as $Pd(NO_3)_3$. The material is mixed and reduced with 16 ml of $N_2H_4.H_2O$ solution with constant mixing. The impregnated powder is dried and then calcined for one and one-half hours at 375° C. in air.

(c) Two hundred grams of each of powder (a) and (b) is added to a ½ gallon size ball mill with appropriate amount of grinding media. To the powder is added 20 ml of glacial acetic acid and 550 ml of $H_2O$. The sample is ball milled for 16 hours. The resulting slurry has a solids content of 43%, a pH of 4.0 and a viscosity of 337 cps and is used to coat a Corning cordierite monolith having a diameter of 3.66 inches (9.3 cm), a length of 3 inches (7.62 cm) and 400 gas flow passages (of square cross section) per square inch of end face area. The coating is accomplished by dipping the monolith in the slurry for 2 minutes, draining excess slurry and blowing the excess slurry from the gas flow passages with high pressure air. The resultant slurry-coated monolith is dried at 110° C. and calcined at 500° C. in air for 30 minutes. The finished catalyst body contains 238 g of platinum group metal per cubic foot of catalyst body volume at a weight ratio of platinum to palladium of 1:1, with the platinum groups metal dispersed on a baria-lanthia-stabilized alumina "washcoat" support layer. The catalyst body contains 1.64 grams per cubic inch of catalyst body of stabilized alumina washcoat.

A series of partial oxidation catalyst compositions utilizable in accordance with the present invention were prepared by substantially the procedure described in Example 1, with appropriate modifications to obtain the reported loadings of different catalyst metals. Each of the below described materials is a monolithic catalyst composition which is effective for purposes of the invention. Except for the catalyst identified as CPO-5, in each case the honeycomb carrier is a C-400 cordierite carrier (400 gas flow passages per square inch of end face area) manufactured by Corning. The CPO-5 catalyst is on an alpha alumina monolith body, sold under the trademark TORVEX by DuPont, and having 64 gas flow channels per square inch of end face area. The Corning cordierite monoliths have gas flow channels which are square in cross section; those of the TORVEX monolith are hexagonal in cross section. The amount of platinum group metal on the catalyst is given in grams of elemental platinum group metal per cubic foot of monolith catalyst and the amount of refractory metal oxide coating is given in grams per cubic inch of monolith catalyst. The weight ratio of the platinum group metals in the order listed is given in parentheses. Thus, catalyst CPO-1 in Table I, for example, contains platinum and palladium in a weight ratio of one part platinum to one part palladium. In each case, the refractory metal oxide coating is alumina, predominantly comprising gamma alumina stabilized as indicated, the respective weight percents of stabilizer being indicated, the balance comprising substantially alumina.

TABLE I

| Catalyst | PG Metal Component | PG Metal g/ft³ | Weight & and Stabilizer in Support Coating | Alumina Support Coating g/in³ (% Stabilizer) |
|---|---|---|---|---|
| CPO-1 | Pt, Pd (1:1) | 219 | 5% ceria | 1.27 |
| CPO-2 | Pt, Pd (1:1) | 186 | 5% ceria | 1.64 |
| CPO-3 | Pt, Pd (1:4) | 275 | 5% ceria | 1.79 |
| CPO-4 | Pt, Pd (1:1) | 310 | 5% ceria | 2.32 |
| CPO-5(*) | Pt, Pd (1:1) | 200 | 5% ceria | 1.26 |
| CPO-6 | Pt, Pd, Rh (9.5:9.5:1) | 230 | 5% ceria | 1.47 |
| CPO-7 | Pt, Pd (1:1) | 186 | 2.5% lanthia 2.5% baria | 1.64 |

(*)TORVEX alpha alumina monolith; all others are cordierite monoliths.

Generally, the most preferred catalyst metals are platinum and palladium and combinations thereof, preferably, combinations comprising 10–90% by weight palladium, preferably 25–75%, more preferably 60–40% by weight palladium, and about 90 to 10% by weight platinum, preferably 75 to 25%, more preferably 40 to 60% by weight platinum. Generally, as the sulfur content of the hydrocarbon feed being treated in the first catalyst zone increases, a higher proportion of platinum to palladium is preferred. On the other hand, for feeds which have a relatively high methane content, an increasing proportion of palladium is preferred.

The monolithic configuration of the catalytic partial oxidation catalyst of the first catalyst zone affords a relatively low pressure drop across it as compared to the packed bed of a particulate support catalyst. This is particularly important in view of the increase in gas volume occasioned by the reactions taking place in the first catalyst zone. The total moles of product in the first catalyst zone is higher than the total moles of $H_2O$, oxidant gas and hydrocarbon feed introduced therein. The individual gas flow passages of the monolith also serve, in effect, as individual adiabatic chambers, thus helping to reduce heat loss and promote hydrocracking. This is particularly so when the monolithic carrier comprises a ceramic-like material such as cordierite which has generally better heat insulating properties than do the metal substrates and, to this extent, the ceramic-type monolithic carriers are preferred over the metal substrate monolithic carriers. Further, as the monolith body becomes heated during operation, it serves as an excellent heat source, radiating heat back towards the incoming gas stream which is preheated thereby, thus facilitating desired hydrocracking and oxidation reactions.

Steam Reforming Catalyst

The steam reforming catalyst utilized in the second catalyst zone in accordance with the present invention may utilize a monolithic carrier as described above in connection with the partial oxidation catalyst or it may comprise a particulate support such as spheres, extrudates, granules, shaped members (such as rings or saddles) or the like. As used herein and in the claims, the term "particulate catalyst" or the like means catalysts of regularly or irregularly shaped particles or shaped members or combinations thereof. A preferred particulate support is alumina pellets or extrudate having a BET (Brunnauer-Emmett-Teller) surface area of from about 10 to 200 square meters per gram. Alumina or alumina stabilized with rare earth metal and/or alkaline earth metal oxides as described above, may be utilized as the pellets or extrudate. An alumina particulate support stabilized with lanthanum and barium oxides as described above is preferred.

The catalytically active metals for the steam reforming catalyst may comprise any of the catalytic metals known for such purpose, for example, nickel, cobalt and mixtures thereof are well suited for use as steam reforming catalysts. Platinum group metals such as platinum and rhodium or both may also be utilized for steam reforming, as is known in the art. A preferred platinum group metal steam reforming catalyst is a combination of platinum plus rhodium with the rhodium comprising from about 10 to 90% by weight, preferably 30% by weight, of the total platinum group metal present, balance being platinum. the proportion of platinum and rhodium utilized will depend on the type of hydrocarbon feed to be treated in the process. Other platinum group metals may be utilized. For example, as disclosed in U.S. Patent 3,481,722, assigned to the assignee of this application, one or more of platinum, palladium, rhodium, iridium, osmium and ruthenium may be utilized as the steam reforming catalyst.

EXAMPLE 2

(a) A barium nitrate solution is prepared by dissolving 159.9 g $Ba(NO_3)_2$ in 1,650 ml of $H_2O$. Lanthanum nitrate, in the amount of 264.9 g $La(NO_3)_2.6H_2O$ is dissolved in the barium nitrate solution by mixing vigorously to yield a barium-lanthanum solution, to which is added to 3,000 g of high surface area gamma alumina powder. The solution and powder are thoroughly mixed in a sigma blade mixer for 30 minutes.

(b) The impregnated alumina resulting from step (a) was extruded through 1/16" diameter dies so as to give 1/16" diameter extrudate in lengths from ¼" to ⅜".

(c) The extrudates from step (b) were dried at 110° C. for 16 hours and then calcined 2 hours at 1,050° C. in air.

(d) A platinum-rhodium solution was prepared by dissolving 42.0 g Pt as $H_2Pt(OH)_6$ in monoethanolamine and 18.0 g Rh as $Rh(NO_3)_3.2H_2O$ combining the materials in $H_2O$ to provide a solution having a volume of 1,186 ml and a pH of 0.7 after adjustment with concentrated $HNO_3$.

(e) The platinum-rhodium solution of step (d) is added to the extrudate obtained in step (c) in a tumbling coater and mixed for 30 minutes. The impregnated extrudate is dried at 120° C. for 4 hours and then calcined for 30 minutes at 500° C. in air.

The resultant particulate steam reforming catalyst, designated SR-1, comprises 1.4 wt % platinum and 0.6 wt % rhodium on a $La_2O_3$—BaO stabilized gamma alumina extrudate.

The catalysts of Examples 1 and 2 were utilized to generate a hydrogen-rich fuel cell fuel. Before describing this operation, however, a preferred embodiment of the apparatus of the present invention is described in some detail below.

The Autothermal Reactor Vessel

Preferably, the reactor utilized in the autothermal reforming process of the invention comprises a fixed bed, adiabatic reactor. FIG. 1 shows a somewhat schematic rendition of a preferred laboratory or pilot plant size reactor comprising a unitary vessel 1 within which a monolithic carrier partial oxidation catalyst 2 is disposed in flow communication via a passageway 3 with a bed of steam reforming catalyst 4. The vessel is suitably insulated by thermal insulating material 5 to reduce heat losses and to provide essentially a fixed bed, adiabatic reactor. Inlet lines 6, 7, and 8 feed a mixer 9 with, respectively, a hydrocarbon feed, steam and oxygen. The latter may be introduced as an oxygen containing gas, preferably air. The admixed reactants are introduced through an inlet line A into partial oxidation catalyst 2, thence via passage 3 into steam reforming bed 4 from which the contacted material is withdrawn through outlet B. Valves, flow meters and heat exchange units, utilized in a manner known to those skilled in the art, are not shown in the schematic illustration of FIG. 1.

In order to exemplify operation of the autothermal reformer to generate a hydrogen-rich fuel, a test run was carried out in an apparatus substantially in accordance with that schematically illustrated in FIG. 1, in which the monolithic carrier catalyst 2 was of cylindrical configuration, three quarters of an inch (1.9 cm) in diameter and nine inches (22.9 cm) long. The steam reforming bed was a cylindrical bed of particulate catalyst three inches (7.62 cm) in diameter by nine and a quarter inches (23.5 cm) long. The following test run was carried out and the indicated results obtained. In operation, the reactants were preheated with the oxidant stream being preheated separately from the hydrocarbon feed as a safety measure. After preheating, the streams were intimately mixed and immediately fed into the partial oxidation catalyst 2 of vessel 1. Generally, all the oxygen present in the feed reacts within monolithic catalyst bed 2 to oxidize a portion, but not all, of the hydrocarbon feed, resulting in an increase in temperature due to the exothermic oxidation reaction. At least some of the $C_5$ and heavier hydrocarbon is hydrocracked in catalyst bed 2 to lighter, $C_1$ to $C_4$ hydrocarbon fractions. The heated, partially oxidized and hydrocracked effluent from catalyst 2 is then passed through steam reforming catalyst bed 4 wherein the steam reforming reaction reaction takes place. The product gases withdrawn via outlet B are cooled and unreacted water as well as any unreacted hydrocarbon feed is condensed and removed therefrom. The following catalysts were prepared for the test.

EXAMPLE 3

(a) A monolithic partial oxidation catalyst made in accordance with Example 1 has the following composition:

186 g of platinum group metal (pgm) per cubic foot of catalyst volume, the pgm comprising platinum and palladium in a 1:1 weight ratio. The pgm is distended upon a lanthia-baria stabilized predominantly gamma alumina washcoat dispersed on a Corning cordierite monolith $\frac{3}{4}$ inch (1.9 cm) in diameter and 9 inches (22.9 cm) in length, and having 400 gas flow passages per square inch of end face area. The monolith is loaded with 1.64 g of washcoat per cubic inch of catalyst volume.

(b) A pgm steam reforming catalyst is provided by 1,075 ml of catalyst SR-1 of Example 2, in a packed bed measuring 3 inches (7.62 cm) in diameter and $9\frac{1}{4}$ inches (23.5 cm) in depth.

(c) The hydrocarbon feed is a No. 2 fuel oil having the following properties:
API Gravity: 34.7
Distillation Range: 374°–664° F.
Sulfur Content: 1200 parts per million (weight)
Hydrocarbon classes per ASTM D1319:
   Aromatics: 22.0%
   Olefins: 5.7%
   Saturates: 72.3%

(d) The reactor vessel is a fixed bed, adiabatic reactor of the type schematically illustrated in FIG. 1. For safety considerations, the oxidant stream, comprising air, is preheated separately from the hydrocarbon stream in a preheater (not shown in FIG. 1). The steam is separated in two streams, one of which is blended with the oxidant stream and one with the hydrocarbon feed. The preheated streams are intimately mixed within a mixer, schematically illustrated in 9 in FIG. 1, and the combined inlet streams, at a preheat temperature of 749° C., is immediately fed to the partial oxidation catalyst. The partial oxidation catalyst (2 in FIG. 1) in the first catalyst zone contains the monolithic catalyst of (a), above, and the steam reforming catalyst (4 in FIG. 1) in the second catalyst zone contains the SR-1 catalyst of (b), above.

The amounts of steam, air and hydrocarbon feed introduced to the process are controlled to provide a molar ratio of $H_2O$ to C of 2.57 and a molar ratio of $O_2$ to C of 0.378. All of the limited amount of oxygen contained in the inlet feed is completely reacted and a sufficient amount of the hydrocarbon is oxidized to heat the effluent reactant mass, by the exothermic catalytic oxidation reaction, to a temperature of 942° C., high enough for steam reforming. The effluent from the catalytic partial oxidation catalyst 2 is immediately flowed into the steam reforming catalyst 4 and then withdrawn via the outlet opening as indicated by the arrow B in FIG. 1, at an exit temperature of 778° C. The volumetric throughput rate through the partial oxidation catalyst was 126,000 volumes of throughput at standard temperature and pressure per volume of catalyst per hour and the volumetric throughput rate through the steam reforming catalyst (same basis) was 6500.

The product gas is cooled and unreacted water (and unreacted hydrocarbon oil) is condensed therefrom. The dry gas composition is monitored by gas chromatography and the following results were measured and the results tabulated in Table II.

TABLE II

A. Effluent Composition and Hydrocarbon Conversion

| Constituents of Dried Product Gas | Dried Product Gas Composition, Mole % As Measured | |
|---|---|---|
| $H_2$ | 41.11 | ⎫ |
| | | ⎬ 52.63 |
| CO | 11.52 | ⎭ |
| $CO_2$ | 12.51 | |
| $N_2$ | 34.37 | |
| $CH_4$ | 0.26 | |
| $C_2H_6$ | 0.01 | |
| Hydrocarbon Conversion | 98.8%(*) | |

(*)weight percent of quantity of hydrocarbon feed to the reactor.

The following Example 4 provides a comparison between utilizing a commercially available nickel steam reforming catalyst as the steam reforming second zone catalyst (4 in FIG. 1), and increasing the $O_2$ to C ratio, as compared to utilizing a preferred platinum group metal catalyst for the second zone catalyst, and keeping the $O_2$ to C ratio below 0.4. All operating conditions in Examples 3 and 4 are identical, except as specifically otherwise noted.

EXAMPLE 4

The same hydrocarbon feed as employed in Example 3 was utilized,, and the following steam reforming catalyst, commercially available from Girdler Corporation under the designation G90C., was substituted for the steam reforming catalyst of paragraph (b) of Example 3.

G90C Catalyst

| Composition: | | Properties: | |
|---|---|---|---|
| Ni | 15.4 weight % | Surface area: | 16.2 m²/g |
| Ca | 0.21 weight % | Compacted bulk density: | 1.2 g/ml |
| $Al_2O_3$ | balance | Total porosity (Hg): | 0.215 ml/g |
| | | Tablet shape measuring $\frac{1}{8}$ inch by $\frac{1}{8}$ inch (0.32 cm by 0.32 cm) | |

The molar ratio of $H_2O$ to C was 2.59 and the molar ratio of $O_2$ to C was 0.41. The results tabulated in Table III were attained.

TABLE III

| Constituents Dried Product Gas | Dried Product Gas Composition, Mole % As Measured | |
|---|---|---|
| $H_2$ | 34.5 | ⎫ |
| | | ⎬ 46.0 |
| CO | 11.5 | ⎭ |
| $CO_2$ | 11.9 | |
| $N_2$ | 41.3 | |
| $CH_4$ | 0.75 | |
| $C_2H_6$ | 0.01 | |
| $C_2H_4$ | 0.01 | |
| Hydrocarbon Conversion | 96.7%(*) | |

(*)weight percent of quantity of hydrocarbon feed to the reactor.

B. Throughput and Temperatures
Volumetric throughput rate, volumes of throughput at standard temperature and pressure per volume of catalyst per hour:

| | |
|---|---|
| monolithic partial oxidation catalyst (item 2 in FIG. 1) | 126,000 |
| particualate steam reforming catalyst (item 4 in FIG. 1) | 6,500 |
| Preheat Temperature (line A of FIG. 1) | 690° C. |

TABLE III-continued

| Exit Temperature (line B of FIG. 1) | 793° C. |

A comparison of the results of Table II with those of Table III shows that although the process results of Table III are good, the use of the nickel catalyst in the steam reforming section was not as effective for converting the No. 2 fuel oil. Also, the product gas in Table III contained significantly more nitrogen, 41.3% as compared to 34.37% in Table II. As indicated by the results in Table II, the use of the platinum-rhodium steam reforming catalyst attained nearly 100% conversion of the No. 2 fuel oil, as compared to 96.7% when the nickel catalyst was used in accordance with the invention. Also, although not reported in the Tables, when the nickel catalyst was employed, a rapid increase in reactor pressure drop was observed. This could have been due to soot accumulation on the nickel steam reforming catalyst. The platinum group metal catalysts were able to operate much closer to the theoretical soot line with respect to $H_2O$ to C and $O_2$ to C ratios, without significant soot deposition. It appears that the platinum group metal catalysts may catalyze a carbon oxidation reaction which removes soot from the catalyst, and this is useful since the invention requires limiting the $O_2$ to C ratio to a maximum of 0.4.

Referring now to FIG. 2, there is shown a schematic illustration of a fuel cell power plant utilizing autothermal reforming to provide the hydrogen fuel required for the fuel cell. A source of hydrocarbon feed is introduced via fuel line 10 which passes through a heater 12 for preheating and is passed thence by a hydrocarbon feed pump 11 to a mixer for admixture with air and steam as described below. Air is introduced via a line 16 into a compressor 18 which is driven by a turbine 19 via a shaft (un-numbered). Compressor 18 compresses the air to an elevated pressure and the compressed air is transported via compressed air line 20 through heater 12 for preheating, then to mixer 14. A portion of the compressed air is diverted via line 22 to provide combustion air to a burner 24 which comprises a part of heater 12. Anode vent gas, obtained as described below, is introduced via line 26 as fuel into burner 24. The air-hydrogen fuel mixture thus supplied to burner 24 is combusted to heat the several lines passing through heater 12. Water is introduced via line 28 and a boiler feed pump 29 into heat exchanger 30 wherein it is heated by heat exchange with the effluent emerging from autothermal reformer 32 via discharge line 34. Steam is generated in heat exchanger 30 and passed via steam line 36 into mixer 14. A resultant mixture of air, steam and hydrocarbon feed obtained in mixer 14 is introduced via inlet line 38 as the inlet stream to autothermal reformer 32. The feed to autothermal reformer 32 is supplemented with a side stream of hydrogen containing anode vent gas taken from line 26 via recycle line 40.

In reformer 32 the inlet stream mixture of fuel, steam and air is passed initially through a catalytic partial oxidation catalyst supported on a monolithic honeycomb carrier disposed within the neck portion 32a of reformer 32. As described above, a portion, less than all, of the hydrocarbon feed content of the inlet stream is catalytically oxidized within the first catalyst zone. The remaining $C_5$ or heavier hydrocarbon feed is hydrocracked to lighter, $C_1$ to $C_4$, constituents.

The effluent from the first catalyst zone passes into the second catalyst zone comprising a steam reforming catalyst contained within main body portion 32b of reformer 32. As described above, the steam reforming reaction is catalyzed herein to convert hydrocarbons to hydrogen and carbon oxides. Effluent from the autothermal reformer is passed via line 34 as described above, through heat exchanger 30 and thence to shift reactors and sulfur removal treatment.

Typically, the outlet temperature of the second zone effluent in line 34 will be from 1600° F. to 1800° F. (871° C. to 982° C.) and will be cooled in heat exchanger 30 to a temperature of about 800° F. to 900° F. (427° C. to 482° C.), a temperature suitable for shift conversion as described below.

Shift converters are conventionally employed in conjunction with steam reforming operations. In steam reforming the hydrocarbon reacts with $H_2O$ to yield a product gas containing primarily hydrogen and carbon monoxide, plus any unreacted hydrocarbons. In order to reduce the carbon monoxide level and enhance the hydrogen yield, the effluent of the steam reforming process may be passed into a so-called shift converter, in which the effluent is contacted with a catalyst over which carbon monoxide will react with $H_2O$ to yield carbon monoxide and hydrogen according to the following reaction:

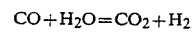

$$CO + H_2O = CO_2 + H_2$$

This water gas shift reaction is often carried out in two stages, a first high temperature stage (e.g., 800°–900° F.) in order to secure high reation rates and a second, low temperature stage (e.g., 700°–750° F.) to enhance the overall yield of the reaction. Accordingly, as shown in FIG. 2, the effluent from reformer 32 is passed via lines 34a into a high temperatue shift reactor 40, thence via line 34b into a sulfur guard unit 42. The sulfur guard unit may comprise any suitable device for removing or reducing the sulfur content of the gas stream, such as the known iron oxide or zinc oxide dry removal processes, or a known wet method for the removal of sulfur and sulfur compounds. The treated effluent from the sulfur guard unit 42 is passed via line 34c to a low temperature shift reactor 44 in which a second, low temperature shift reaction is carried out to convert remaining carbon monoxide to carbon dioxide and hydrogen. The resultant hydrogen-rich gas stream, containing primarily $N_2$, $CO_2$, $H_2O$ and $H_2$, passes from low temperature shift converter 44 via line 46 for introduction into a fuel cell stack 48.

For many fuel cells, such as for example, for a molten carbonate or phosphoric acid electrolyte fuel cell, the carbon dioxide content of the hydrogen-rich gas stream is acceptable. However, it will be appreciated that the hydrogen-rich effluent stream passing through line 46 may be treated, if necessary or desired, to purify the hydrogen stream by removal or reduction of the quantity of carbon dioxide and, optionally, other contaminants which may be contained therein.

For clarity of illustration, fuel cell stack 48 is schematically represented as comprising a single anode and cathode but it will be appreciated that usually a plurality of such electrode pairs are assembled into a stack to provide the conventional fuel cell stack. The hydrogen-rich fuel is introduced via line 46 into the anode compartments of the fuel cell stack. An oxygen-containing stream, in this case air, is passed via line 50 from air compressor 18 and is introduced into the cathode compartments of fuel cell stack 48. The oxygen contained in the air stream reacts with hydrogen contained in the hydrogen fuel stream within the fuel cell in the known manner, and an external electrical current is generated for use as required, as indicated by the DC outlet 52. Only about 80% of the hydrogen introduced into fuel cell means 48 is consumed in the reaction and the anode vent gas, which therefore comprises a hydrogen containing stream, is then passed via line 26 as mentioned above, for use as fuel in burner 24 of heater 12, with a side stream of the anode vent gas being utilized to supplement, via line 40, the feed to reformer 32. The cathode vent gas, which comprises an oxygen containing stream and contains most of the water formed in the fuel cell reaction, is passed via line 54 through heater 12 wherein it is heated and then passed via line 56 to drive turbine 19 to provide the power to operate compressor 18. Combustion exhaust gases from burner 12 are passed via line 58 to turbine 19 as part of the driving gas to operate compressor 18. Turbine exhaust gases are passed via line 58 to heat exchanger 60 wherein heat is recovered therefrom and the cooled exhaust gases are passed to a flue as flue gas.

A gaseous coolant may be introduced to fuel stack 48 via line 62 and withdrawn via line 64 for heat recovery and moisture removal from fuel cell stack 48, in the known manner. Other means of cooling the fuel cell stack may be employed, such as using liquid coolant in cooling plates or by generation of steam within the stack. A typical phosphoric acid electrolyte fuel cell operates at a temperature of, e.g., 375° F. (191° C.) so the heat recovered is at a high enough temperature for heating and other uses.

The autothermal reforming process of the invention is advantageously employed to provide a hydrogen fuel for a fuel cell from a hydrocarbon feed, and is particularly advantageous when natural gas or methane is not readily available to provide the hydrocarbon fuel. The process as described may advantageously utilize liquid hydrocarbon feeds such as liquified petroleum gas, JP-4, fuel, No. 2 fuel oil, demetallized gas oils and ash and metal free coal derived liquids. Such liquids generally are difficult to steam reform by conventional steam reforming processes.

In order to enhance the efficiency of the fuel cell power plant, the oxygen to carbon ratio utilized in the autothermal reformer 32 must be low, preferably not more than about 0.35. The fuel cell voltage, which is directly related to the efficiency of the fuel cell, increases with hydrogen partial pressure. At a low oxygen to carbon level maintained in the reformer 32, the amount of diluent nitrogen introduced with the air utilized to provide the hydrogen is relatively low, and the hydrogen partial pressure of the resultant fuel gas is relatively high, as compared to the situation wherein a higher oxygen to carbon level is utilized.

Preheating the fuel fed to reformer 32 is also useful inasmuch as higher preheat temperatures likewise lower the amount of oxygen necessary in proportion to the hydrocarbon fuel being reformed. Generally, as indicated in U.S. Pat. No. 3,976,507 (issued Aug. 24, 1976 to Bloomfield) increased system pressure is generally advantageous for a fuel cell system.

As mentioned above, the process of the invention is not limited to phosphoric acid electrolyte fuel cells but is applicable generally to any fuel cell which requires a hydrogen fuel. Molten carbonate fuel cells may also make use of the hydrogen-rich stream provided by the reforming process of the invention. Molten carbonate fuel cells operate at about 1200° F. and would not require the utilization of shift reactors as illustrated in FIG. 2 because carbon monoxide entering the cell will be shift reacted at the cell operating temperature in the presence of molten carbonate. The molten carbonate fuel cells are more electrically efficient than phosphoric acid electrolyte fuel cells and, because of their significantly higher operating temperatures, produce high quality, i.e., high temperature steam as a by-product.

While the invention has been described in detail with respect to specific preferred embodiments thereof, it will be appreciated that those skilled in the art, upon a reading and understanding of the foregoing will readily envision modifications and variations to the preferred embodiments which are nonetheless within the spirit and scope of the invention and of the claims.

What is claimed is:

1. A process for generating electricity from a fuel cell means, said fuel cell means comprising a stack of anodes and cathodes and having an anode side and a cathode side, each side dimensioned and configured for the passage of respective gas streams therethrough, said fuel cell means being fueled by a hydrogen-rich gas derived by treating a hydrocarbon feed in a reformer having first and second catalyst zones as defined below, the process comprising:
   (a) preheating an inlet stream comprising a hydrocarbon feed, $H_2O$ and air to a preheat temperature sufficiently high to initiate catalytic oxidation of said hydrocarbon feed as defined below;
   (b) introducing the preheated inlet stream into the first catalyst zone comprising a monolithic body having a plurality of gas flow passages extending therethrough and containing a catalytically effective amount of palladium and platinum catalytic components dispersed therein, the amount of hydrocarbon feed, $H_2O$ and air introduced into said first catalyst zone being controlled to maintain an $H_2O$ to C ratio of from at least about 0.5 to about 5 and an $O_2$ to C ratio of from about 0.3 to 0.4 in said inlet stream;
   (c) contacting the preheated inlet stream within said first catalyst zone with said palladium and platinum catalytic components to initiate and sustain therein catalytic oxidation of said hydrocarbon feed to produce hydrogen and carbon oxides therefrom, the temperature of at least a portion of said monolithic body being at least about 250° F. (139° C.) greater than the temperature of said inlet stream, and oxidizing in said first catalyst zone a quantity, less than all, of said hydrocarbon feed, which quantity is sufficient (i) to attain a temperature within said first catalyst zone sufficiently high to crack substantially all unoxidized $C_5$ or heavier hydrocarbons, if any, therein to $C_1$ to $C_4$ hydrocarbons, and (ii) to heat such first zone effluent to a elevated temperature high enough to catalytcally steam reform, within a second catalyst zone defined below, the hydrocarbon remaining in such first zone effluent without supplying external heat thereto;
   (d) passing the first zone effluent, while still at an elevated temperature, from said first catalyst zone to the second catalyst zone containing a platinum group metal steam reforming catalyst therein, and contacting the first zone effluent in said second catalyst zone with said steam reforming catalyst to react hydrocarbons therein with H₂O to produce hydrogen and carbon oxides therefrom;

(e) withdrawing the effluent of said secon catalyst zone as a hydogen-rich gas and passing said hydrogen-rich gas to the anode side of said fuel cell means;

(f) introducing an air stream to the cathode side side of said fuel cell means; and (g) operating said fuel cell means to generate therefrom output electricity, a hydrogen-containing anode vent gas, and a cathode vent gas.

2. The process of claim 1, further including combusting at least a portion of the anode vent gas to supply heat for the preheating of step (a).

3. The process of claim 1 including further treating said hydrogen-rich gas prior to passing it to the anode side of said fuel cell means, by shift converting to react residual carbon monoxide therein with water to yield additional hydrogen and carbon dioxide.

4. The process of claim 1 wherein the preheat temperature is from about 1200° F. to 1400° F. (649° C. to 760° C.).

5. The process of claim 1 wherein said first catalyst zone is maintained at a temperature of from about 1600° F. to 2,400° F. (871° C. to 1,316° C.) and the first zone effluent is introduced into said second catalyst zone at substantially the same temperature.

6. The process of claim 1 wherein said fuel cell means is operated at an elevated pressure and further including compressing said air stream to said elevated pressure prior to introducing it into the cathode side of said fuel cell means.

7. The process of claim 6 wherein a compressor employed to compress said air stream is driven at least in part by cathode vent gas.

8. The process of claim 6 or claim 7 wherein said elevated pressure is a pressure up to about 150 psia.

9. The process of claim 1 wherein a volumetric hourly rate of at least 100,000 volumes of throughput per volume of catalyst is maintained in said first catalyst zone.

10. The process of claim 1 wherein said catalytic components of said first catalyst zone comprises palladium, platinum, and, optionally, rhodium catalytic components distended upon a refractory metal oxide support layer carried on said monolithic body.

11. The process of claim 10 wherein the platinum group metal portion of said first catalyst zone comprises, on an elemental metal basis, about 10 to 90% by weight palladium and about 90 to 10% by weight platinum.

12. The process of claim 1 wherein said steam reforming catalyst comprises platinum and rhodium catalytic components.

13. The process of claim 12 wherein the platinum group metal portion of said steam reforming catalyst comprises, on an elemental metal basis, about 10 to 90% by weight rhodium, and about 90 to 10% platinum.

14. The process of claim 1 wherein said hydrocarbon feed is a normally liquid hydrocarbon.

15. A process for generating electricity from a fuel cell means, said fuel cell means comprising a stack of anodes and cathodes and having an anode side and a cathode side, each side dimensioned and configured for the passage of respective gas streams therethrough, said fuel cell means being fueled by a hydrogen-rich gas derived by treating a normally liquid hydrocarbon feed at an elevated reformer pressure in a reformer having first and second catalyst zones as defined below, the process comprising:

(a) preheating an inlet stream comprising a normally liquid hydrocarbon feed, H₂O and a first air stream to a preheat temperature of about 1200° F. to 1400° F. (699° C. to 760° C.) and introducing the preheated inlet stream at the elevated reformer pressure into the first catalyst zone comprising a monolithic body having a plurality of gas flow passages extending therethrough and containing a catalytically effective amount of palladium and platinum catalytic components dispersed therein, the amounts of hydrocarbon feed, H₂O and air introduced into said first catalyst zone being controlled to maintain an H₂O to C ratio of from about 0.5 to 5 and an O₂ to C ratio of from about 0.3 to 0.4 in said inlet stream;

(b) contacting the preheated inlet stream within said first catalyst zone with said platinum group metal catalyst at a volumetric hourly rate of at least about 100,000 volumes of throughput per volume of catalyst per hour to initiate and sustain therein catalytic oxidation of said hydrocarbon feed to produce hydrogen and carbon oxides therefrom, and oxidizing in said first catalyst zone a quantity, less than all, of said hydrocarbon feed, which quantity is sufficient (i) to attain a temperature within said first catalyst zone sufficiently high to crack substantially all unoxidized C₅ or heavier hydrocarbons therein to C₁ to C₄ hydrocarbons, and (ii) to heat such first zone effluent to an elevated temperature of from about 1600° F. to 2,400° F. (871° C. to 1,316° C.);

(c) passing the first zone effluent, while still at said elevated temperature, from said first catalyst zone to the second catalyst zone containing a platinum group metal steam reforming catalyst therein, and contacting the first zone effluent in said second catalyst zone with said reforming catalyst at an hourly volumetric rate of from about 2,000 to 20,000 volumes of throughput per volume of catalyst, to react hydrocarbons therein with H₂O to produce hydrogen and carbon oxides therefrom;

(d) withdrawing the effluent of said second catalyst zone as a hydrogen-rich gas and passing said hydrogen-rich gas into the anode side of said fuel cell means;

(e) introducing a second air stream at an elevated fuel cell pressure into the cathode side of said fuel cell means; and (f) operating said fuel cell means at the elevated fuel cell pressure to generate therefrom output electricity, a hydrogen-containing anode vent gas, and a cathode vent gas.

16. The process of claim 15 wherein said elevated fuel cell pressure is a pressure from above atmospheric pressure up to about 150 psia and said reformer elevated pressure is at least as high as said fuel cell elevated pressure.

17. The process of claim 15 or claim 16 wherein said first and second air streams are compressed in a turbine-driven compressor, the turbine of which is driven at least in part by discharged cathode vent gas.

18. The process of claim 17 wherein the pre-heating of step (a) is carried out in a burner, the fuel supply of which is provided at least in part by discharged anode vent gas.

19. The process of claim 15 or claim 16 wherein said platinum group metal catalyst comprises one or more of platinum, palladium and rhodium catalytic components distended upon a stabilized alumina support layer carred on said monolithic body, and said steam reforming catalyst comprises one or more of platinum and palladium catalytic components.

20. The process of claim 15 or claim 16 further including treating said hydrogen-rich gas prior to passing it to the anode side of said fuel cell means by reducing the sulfur content thereof and shift converting to react carbon monoxide contained therein with water to produce additional hydrogen and carbon dioxide.

21. The process of claim 15 or claim 16 wherein said catalytic components of said first catalyst zone comprise, on an elemental metal basis, about 10 to 90% by weight palladium, 90 to 10% by weight platinum and said catalytic components of said second catalyst zone comprise, on an elemental basis, about 10 to 90% by weight rhodium and 90 to 10% by weight platinum.

22. The process of claim 21 wherein said catalytic components of said first catalyst zone comprise about 25 to 75% by weight palladium, 75 to 25% by weight platinum and said catalytic component of said second catalyst zone comprise about 20 to 40% by weight rhodium and 80 to 60% by weight platinum.

23. The process of claim 22 wherein said catalytic components of said first catalyst zone comprise about 60 to 40% by weight palladium and about 40 to 60% by weight platinum.

* * * * *